C. M. BONDY
Nov. 25, 1930. BUTTON Re. 17,877
Original Filed Feb. 27, 1928
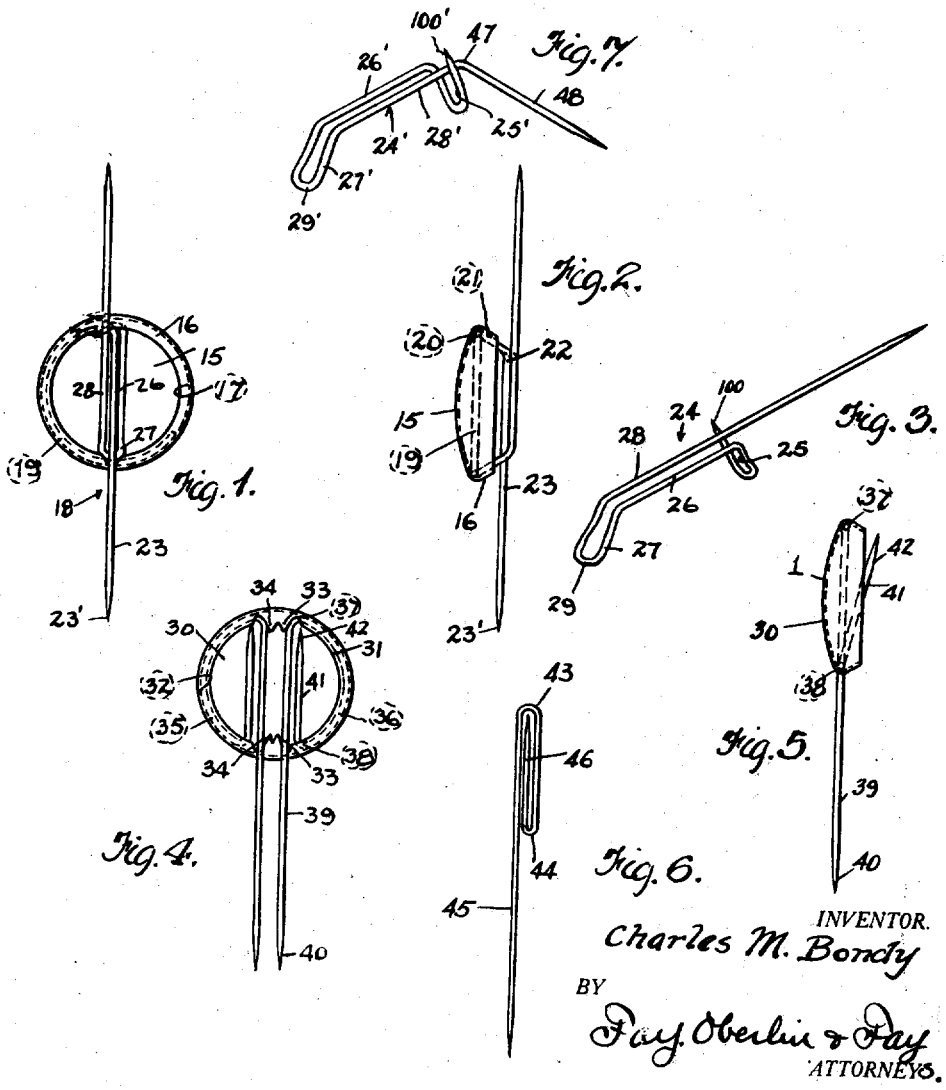
INVENTOR.
Charles M. Bondy
BY
Fay, Oberlin & Fay
ATTORNEYS.

Reissued Nov. 25, 1930 Re. 17,877

UNITED STATES PATENT OFFICE

CHARLES M. BONDY, OF CLEVELAND, OHIO, ASSIGNOR TO THE BONDY AUTO TOP COMPANY, OF CLEVELAND, OHIO, A CORPORATION OF OHIO

BUTTON

Original No. 1,688,520, dated October 23, 1928, Serial No. 257,217, filed February 27, 1923. Application for reissue filed February 18, 1930. Serial No. 429,432.

The present invention relates, as indicated, to buttons, and more particularly to easily attachable buttons for upholstery. Specifically, the buttons disclosed in the present application are primarily adapted for use in automobile seat covering, and they comprise essentially a head provided with pins or prongs extending in different directions, said pins being adapted to be pushed through the covering for the automobile seat. The primary object of the invention is to provide a simple and inexpensive button of the type described which will be easily attachable, which will not readily become accidentally dislodged, but which will be relatively easy to remove in case such removal becomes necessary. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a bottom plan view of one form of button contemplated by the present invention; Fig. 2 is a section through the button disclosed in Fig. 1; Fig. 3 is a perspective view of the secondary pin disclosed in Figs. 1 and 2; Fig. 4 is a bottom plan view of a modified form of button; Fig. 5 is a side elevation thereof; Fig. 6 is a plan view of a further type of pin; and Fig. 7 is a view similar to Fig. 3 showing a slightly modified form of secondary pin.

Referring more particularly to the drawings, and specifically to Figs. 1 to 3, it will be seen that the element illustrated therein comprises a cap or button proper 15 provided with an inturned flange 16 forming an annular seat 17. A wire 18 is bent to provide a part-circular portion 19 adapted to be recived in said seat 17. At 20, said wire is bent at an angle to form a leg 21, and at 22 said wire is again bent to form a shank 23 lying in a plane parallel to but spaced from the plane of the part-circular portion 19. The free end 23′ of said wire 18 is sharpened as illustrated.

A second pin wire 24 is bent to form an eye 25 and a leg 26, and is then rebent to form a loop 27 and a shank 28 lying parallel to said leg 26 and slightly spaced therefrom, said shank being of considerably greater extent than said leg. Said second pin is adapted to be secured to said button by slipping said shank 23 through said eye 25. It will be seen that the end 29 of the rebent portion forming the loop 27 is bent slightly outwardly to form a lip. After the shank 22 has been slipped through the eye 25, said lip 29 is forced beneath said flange 16 to secure said second pin firmly in position. In attaching the button disclosed in Figs. 1 to 3, inclusive, the shank 28 of the wire 24 is forced into the fabric or similar material with the eye and the loop 27 upstanding from the surface of the material. The pointed end 100 of the leg 26 will enter the material after the pin has been positioned to prevent accidental shifting thereof. The shank 23 of the wire 18 is then inserted through the eye 25, and, passing between the shank 28 and the leg 26 of the wire 24, the shank 23 enters the fabric. It will be understood that the button 15 is secured to the wire 18, and as the shank 23 is pushed home, the wire 18 is sprung to permit the flange 16 of the button 15 to override the projecting ends of the portions of the wire 24 forming the eye 25 and the loop 27. It will be seen that the lip 29 will be entered in the button beneath the flange 16 thereof to prevent accidental removal of the button from the wire 24.

Referring now to Figs. 5 and 6, it will be seen that the cap 30 is formed with an inturned flange 31 forming an annular seat 32, and that said flange is provided with two pairs of substantially oppositely disposed inwardly extending shoulders 33 and 34. Two pins are used with this modification, each pin comprising a crescent shaped portion 35, the curve 36 of which is received in said seat 32, and the horns 37 and 38 of which abut against one pair of shoulders 33 or 34. From the horn 37 there extends a shank 39, traversing the bottom face of the cap 30, and having its free end 40 sharpened. Similarly from the horn 38 there extends a much shorter shank 41 also traversing the lower face of the cap 30 and having its free end 42 sharpened. As is clearly shown in Fig. 5, the shank 39 extends substantially in the plane of the cap or button 30, while the shank 41 extends at an angle to the plane of said button. In attaching the button disclosed in Figs. 4 and 5, the shanks 39 are forced into the fabric or other material far enough to wrinkle the material. Pressure being applied on the outer face of the cap 30, it will be seen that the resilient return of the material to a smooth condition will force the pointed ends 42 of the shanks 41 into said material to secure the button firmly in place.

It will be apparent that the pin disclosed in Fig. 6 can be used with the cap 30, the ends 43 and 44 of the rebent portion of said pin being received beneath the flange 31 and held against transverse shifting by the shoulders 37 or 38 on said flange. The shanks 45 and 46 of this pin will extend substantially in the plane of, and at an angle to the plane of, said cap 30 respectively, as do the shanks 39 and 41 of the pin disclosed in Figs. 4 and 5.

Fig. 7 illustrates a modified form of the wire or secondary pin illustrated in Fig. 3. The wire 24′ is bent to conform in every way with the wire 24 save that, at a point immediately beyond the eye 25′ the shank 28′ of said wire 24′ is bent laterally at right angles as at 47 to provide a laterally extending shank 48. It will be seen that the wire 24′ provides an eye 25′, a leg 26′, a loop 27′ formed to provide a lip 29′, and a shank 28′. The wire 24′ is adapted to be used in conjunction with the button 15 and its wire 18 where, for instance, the button is to be attached to a corner of the fabric where the straight shank 28 of the wire 24 could not be inserted.

It may further be noted that, as a further modification of the button disclosed herein, I might form the button proper as one member of a common snap fastener having attached thereto a pin. A second pin might be attached to the other member of the snap fastener so that the two pins could be inserted in the fabric separately and then fastened together by means of the snap fastener.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. The combination with a button of a plurality of separate pin members secured to said button, at least one of said pin members being readily detachable from said button.

2. The combination with a button having a pin secured thereto, of a second pin provided with means for securing the same to said button, said means permitting ready removability of said second pin.

3. In combination with a button and a wire secured to said button and providing a shank slightly spaced from and substantially parallel to the plane of said button, a second wire bent to provide an eye and a shank, said eye being adapted to receive said first shank to secure said second shank to said button.

4. In combination with a button and a wire secured to said button and providing a shank slightly spaced from and substantially parallel to the plane of said button, a second wire rebent to provide an out-turned lip, the end of one leg of said wire being looped about the other leg to form an eye, said eye being adapted to receive the shank of said first wire and said lip being adapted to be engaged with said button to secure said second wire to said button.

5. In combination with a button and a wire secured to said button and providing a shank slightly spaced from and substantially parallel to the plane of said button, a second wire rebent to provide an out-turned lip, the end of one leg of said wire being looped about the other leg to form an eye, and said other leg being bent laterally substantially at right angles adjacent said looped portion, said eye being adapted to receive the shank of said first wire and said lip being adapted to be engaged with said button to secure said second wire to said button.

6. In combination with a button having an inturned flange forming an annular seat, a wire bent to provide a substantially annular portion and a shank portion, said shank portion lying in a plane spaced from and substantially parallel to the plane of said annular portion, and a second wire bent to provide an eye and a shank, said eye being adapted to receive said first shank to secure said second shank to said first shank, and said second shank being adapted to extend oppositely from said first shank.

7. In combination with a button having an inturned flange forming an annular seat; said flange being provided with two pairs of oppositely disposed inwardly extending shoulders and a pair of pins, each of said pins comprising a wire having sharpened ends and bent to form a crescent; the curve of said crescent being received in said seat, and the horns of said crescent abutting against one pair of said shoulders; the longer of said ends being bent to extend outwardly from said button in one direction and substantially in the plane of said button, and the shorter of said ends being bent to extend outwardly from said button in the opposite direction and at an angle to the plane of said button.

Signed by me this 11 day of February, 1930.

CHARLES M. BONDY.